United States Patent [19]

Miyauchi et al.

[11] Patent Number: 5,229,569
[45] Date of Patent: Jul. 20, 1993

[54] LASER MACHINING APPARATUS AND METHOD OF THE SAME

[75] Inventors: Tateoki Miyauchi; Shigenobu Maruyama; Katsurou Mizukoshi; Mikio Hongo, all of Yokohama; Koyo Morita, Yamanashi; Kaoru Katayama, Hadano; Minoru Suzuki; Kazuo Mera, both of Hitachi; Haruhisa Sakamoto, Yokohama, all of Japan

[73] Assignee: Hitachi, Ltd., Tokyo, Japan

[21] Appl. No.: 707,608

[22] Filed: May 30, 1991

[30] Foreign Application Priority Data

May 30, 1990 [JP] Japan ................................. 2-138195
Mar. 29, 1991 [JP] Japan ................................. 3-065962

[51] Int. Cl.⁵ ............................................. B23K 26/00
[52] U.S. Cl. ............................. 219/121.6; 219/121.86
[58] Field of Search ........... 219/121.6, 121.85, 121.83, 219/121.86

[56] References Cited

U.S. PATENT DOCUMENTS

| | | | |
|---|---|---|---|
| 3,571,748 | 3/1971 | Koester et al. | 356/138 X |
| 4,097,715 | 6/1978 | Frizzi | 215/121.85 |
| 4,806,321 | 2/1989 | Nishizawa et al. | 118/725 X |
| 5,011,759 | 4/1991 | Hitotsuyanagi et al. | 427/53.1 X |

FOREIGN PATENT DOCUMENTS 58-135788 8/1983 Japan .
62-212091 9/1987 Japan .
8706865 11/1987 PCT Int'l Appl. .

*Primary Examiner*—C. L. Albritton
*Attorney, Agent, or Firm*—Antonelli, Terry, Stout & Kraus

[57] ABSTRACT

A laser machining apparatus includes a laser beam source, such as of excimer laser, which produces a laser beam to be projected on a work piece or a sample, first and second illumination light sources which have wavelengths substantially equal to the wavelength of the laser beam and illuminate the entire image and the laser beam, respectively, a first beam splitter which guides the image produced by the illumination light to an observation unit, a second beam splitter which guides the laser beam from the laser beam source to an objective lens, and a controller which controls the machining condition including the relative positioning between the sample and the laser beam depending on the result of observation. The laser beam guide path structure from the laser beam source to the sample has its interior wall made of laser-transparent material such as glass, and the transparent material is enclosed by a laser blocking material such as a metal or water.

26 Claims, 10 Drawing Sheets

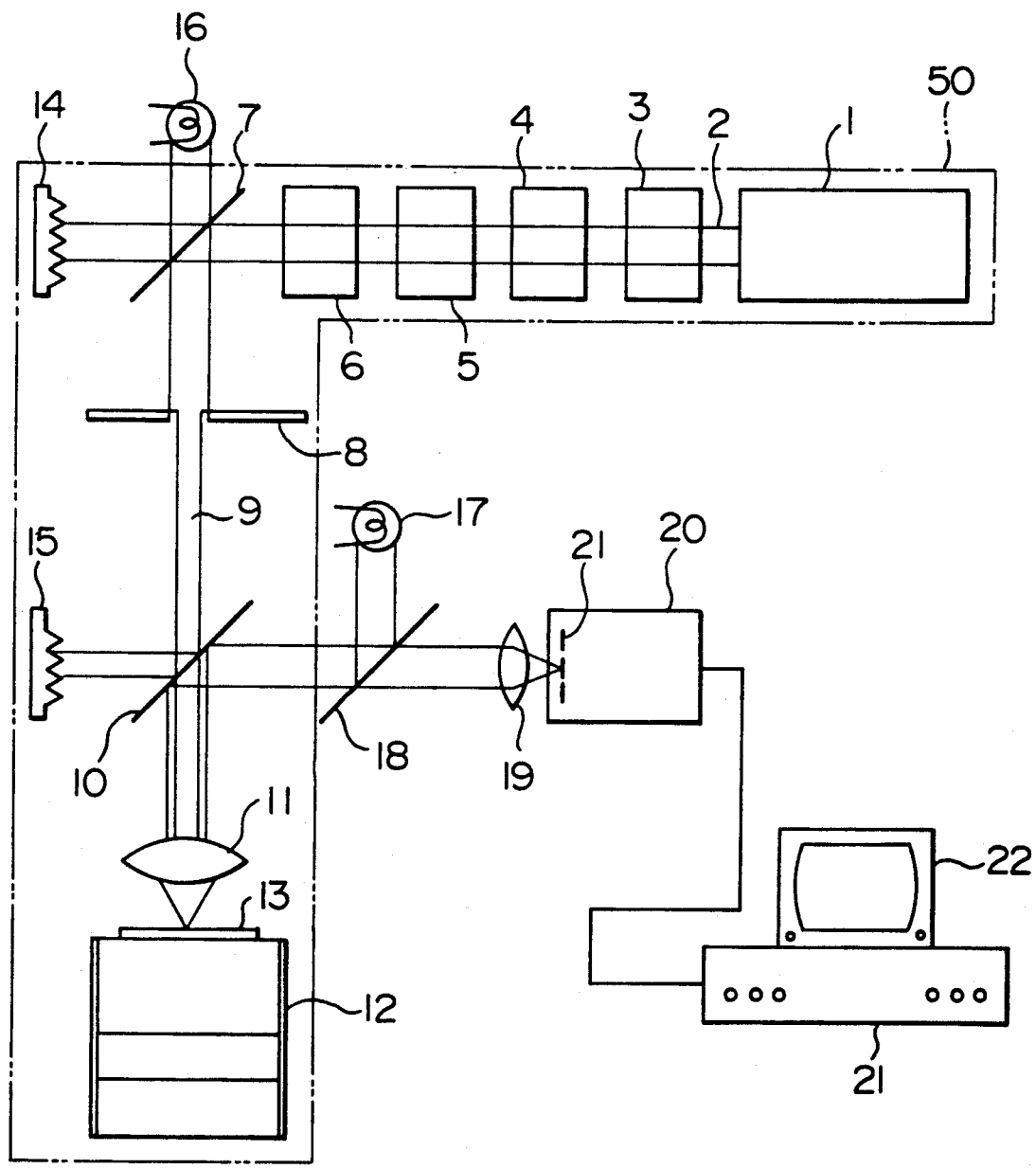
F I G. 1

LASER MACHINING APPARATUS AND METHOD OF THE SAME

BACKGROUND OF THE INVENTION

The present invention relates to the technology of high-power laser application apparatus such as laser machining apparatus and a method of the same. More particularly, the invention relates to laser machining apparatus, laser lithography apparatus, and a method thereof using an excimer laser beam with a wavelength of invisible vacuum ultraviolet rays.

A conventional laser machining apparatus has the observation wavelength made different from the wavelength of the machining laser beam, as described in a Japanese literature "Laser Machining", pp. 84–85, by Susumu Nanba, et al., published on Nov. 30, 1972 by Nikkan Kogyo Shinbun. FIG. 2 is the most simplified illustration of the conventional laser machining apparatus. In the figure, a near infrared light beam with a 1.06 $\mu$m wavelength produced by a laser oscillator 31 is reflected by a mirror 32 which reflects the laser and transmits the visible light, and guided to an objective lens 33 by which the laser beam is focused on a work piece 34 placed on a table 35 so that it is machined For the observation of machining, the image of the work piece 34 received by the objective lens 33 is transmitted through the mirror 32 and focused on the operator's eye by an objective lens 36 so that the operator adjusts the laser beam to maintain the machining accuracy.

However, the conventional technique uses different wavelengths for the machining laser beam and observation light, and therefore color matching is needed for the objective lens or a compensation for color matching by some means is required for accurate observation.

Various application techniques of the excimer laser, which include excimer doping of semiconductor, thin film formation and laser fabrication, pertaining to this invention are disclosed in Japanese publication "Machine Tool Series, Laser Machining", pp. 135–154, which is a separate issue of "Applied Mechanics", published on Sep. 10, 1990. The frontier technology of excimer laser is introduced in publication "Precision Engineering" (JSPE), by Ueda, No. 5, pp. 837–840, published in 1989, and the current topics and prospect of submicron lithography based on excimer laser is introduced in "Applied Physics", Vol. 56, No. 9, pp. 44–48, published in 1987.

FIGS. 12 and 13 show examples of conventional laser application apparatus that are illustrated on pages 32 and 33 of "The 5th Laser School Text, B3, Safety of Laser", sponsored by the Optical Industrial Promotion Associates in Japan and the Ministry of Commerce and Industry.

In FIG. 12, a laser beam produced by a $CO_2$ laser source 81 is guided through a metallic conduit 82 with a thickness of 3 mm or more, reflected in a mirror box 84, and focused on a work piece 85 for machining. A machining chamber 83 is made of acrylic resin with a thickness of 10 mm or more and is designed so that the laser beam does not leak out of the chamber. In FIG. 13, the laser beam produced by a YAG laser source 91 is guided through a metallic conduit with a thickness of 1 mm or more, reflected in a mirror box 94, and focused on a work piece 95 for machining. A machining chamber 93 is made of metal and its interior wall is painted in black. An industrial television camera 96 is provided on the mirror box 94 so that machining is observed on a TV monitor 97.

The conventional techniques shown in FIGS. 12 and 13 have their optical systems enclosed by metallic or acrylic material which does not transmit the light so that the laser beam does not leak out. This arrangement, however, imposes such a problem that the laser blocking wall material which is exposed to the laser beam due to diffraction, scattering or other reason is melted, evaporated and removed and consequently deposited on some important optical part, causing it to be damaged or destroyed when it is hit by the laser beam. This problem is especially serious in the fields of high-power laser machining, laser nuclear fusion and laser energy transmission.

SUMMARY OF THE INVENTION

The present invention is intended to solve the foregoing problem, and its primary object is to provide a laser machining apparatus and a method thereof which enable the observation of machining even in the case of using a laser source with a wavelength far from the visible wavelength range, while accomplishing high-accuracy machining. In order to achieve the object, a first feature of the present invention is to use optical systems tuned to substantially the same wavelength for the machining laser beam and the observation light.

Another object of the present invention is to provide a laser application apparatus which is operative continuously without the emergence of substance from the laser beam enclosing structure which can be exposed to a high-power laser beam. In order to achieve the object, a second feature of the present invention is to provide a laser beam enclosure with having an interior wall formed of a material that transmits the laser beam, and an exterior wall of the exclosure formed of a laser beam blocking material.

In the first feature of the present invention, the machining wavelength and observation wavelength are made equal so that there is no displacement between the machining focal position and the observation image position, and consequently accurate positioning and accurate machining are possible. Because of the use of the same wavelength, color matching for the machining objective lens is not needed, which facilitates the design of optical system, particularly for invisible ultraviolet and infrared rays, and it becomes possible to accomplish a high-precision machining optical system in the range of vacuum ultraviolet rays that has scarcely been attempted in the past due to the severe restriction in the availability of material for the optical system. Through proximity color matching, instead of the equal one, a laser machining optical system that has been difficult, if not impossible, in the past can be accomplished.

In the second feature of the present invention, the laser beam enclosing structure, i.e., portions facing the laser beam path, are formed of material which transmits the laser beam, and consequently even if it is exposed to the laser beam by some reasons, the laser beam merely goes through the structure and does not machine it. The transparent enclosure is provided on its exterior wall with a member which blocks the laser beam, and accordingly the laser beam does not go out of the enclosure. Even if the laser beam blocking member is machined by the laser beam, the resulting product stays in the outside of the enclosure and such events as the contamination of optical parts on the beam path and the subsequent damage or destruction of these portions by being exposed to the laser beam do not occur. Consequently, a high-output laser application apparatus can be operated stably for a long time.

Through the provision of a jacket containing circulating liquid as the laser beam blocking member, diffraction energy can be absorbed in the exterior of the transparent laser beam enclosure, and such instability causing factors an ambient temperature rise can be eliminated.

BRIEF DESCRIPTION OF THE DRAWINGS

FIG. 1 is a diagram showing an arrangement of an apparatus according to an embodiment of the present invention;

DESCRIPTION OF THE PREFERRED EMBODIMENTS

Figure 2:
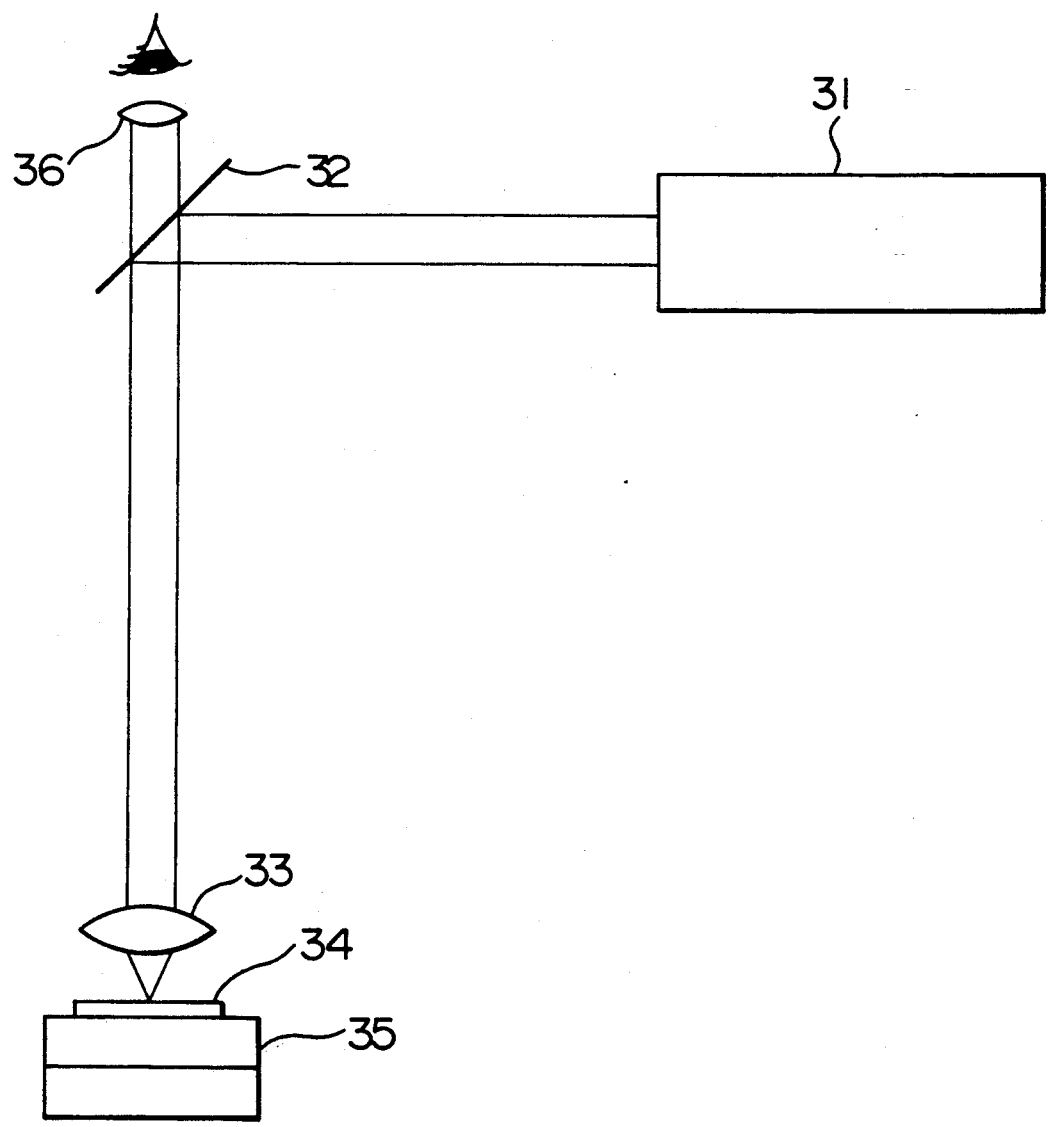
FIG. 2 is a diagram showing a basic structure of a conventional laser machining apparatus.

An embodiment of the present invention will be described with reference to FIG. 1. A vacuum ultraviolet (VUV) laser beam 2 with a wavelength of 193 nm produced by an excimer laser oscillator 1 is shaped to have a rectangular cross section by a beam shaper 3, adjusted for its transmission power by a transmittance filter 4, adjusted for its power density through enlargement or reduction of the beam size by a zoom optical system 5, uniformed for the beam intensity distortion by a beam integrator 6, reflected in its 85% proportion by a first splitter 7, and directed to a rectangular aperture slit 8.

The laser beam 9 shaped by the rectangular aperture slit 8 has its 85% component transmitted by a second split filter 10 and is incident on an objective lens 11 which is tuned to a 193 nm wavelength. The objective lens 11 projects the laser beam with the shape of the rectangular aperture slit 8 on a work piece 13 placed on an XYZ fine movement table set 12, and the work piece 13 is machined.

The 15% laser beam component which transmits the first splitter 7 is absorbed by a first beam damper 14. The 15% laser beam component reflected by the second splitter 10, out of the laser beam 9, is absorbed by a second beam damper 15.

A heavy hydrogen lamp 16, which illuminates the rectangular aperture slit 8 to produce a projection image, has its output light conducted through the first splitter 7, rectangular aperture slit 8 and second splitter 10, and converged by the objective lens 11 and projected on the work piece 13. A heavy hydrogen lamp 17 for general illumination has its 50% component of light output reflected by a third splitter 18, and is further reflected for its 15% component by the second splitter 10 and projected on to the work piece 13 through the objective lens 11.

These images of work piece and slit are collected by the objective lens 11, reflected by the second splitter 10, transmitted by the third splitter 18, and focused by a focusing lens 19 on a light-sensitive screen 21 of a ultraviolet image pickup tube 20. The image pickup tube 20 converts the image into an electrical signal, which is processed by an image signal processor 21, and a resultant observation image is displayed on a display unit 22.

In this manner, the laser beam for machining and the light for observation have the same wavelength, and accordingly there arises no displacement between their images and the work piece is machined accurately. The objective lens 11 is tuned to a single color of 193 nm, which eliminates the difficulty of color matching between the vacuum ultraviolet rays (193 nm) and another color such as color of a visible light and facilitates the development of high-performance lenses. In FIG. 1, the structure and component parts enclosed by the dot-dash line are accommodated in a hermetically sealed enclosure which will be explained in detail in the following embodiments.

Although the embodiment shown in FIG. 1 is pertinent to a vacuum ultraviolet laser machining apparatus, it is apparently applicable also to a visible laser and infrared laser machining apparatus. By choosing the lens system and observation system appropriately, it is apparently applicable also to a soft X-ray machining apparatus. In the case of focal plane machining such as steel plate machining for example, the illumination lamp 16 and aperture slot 8 in the foregoing arrangement are unnecessary.

Figure 3:
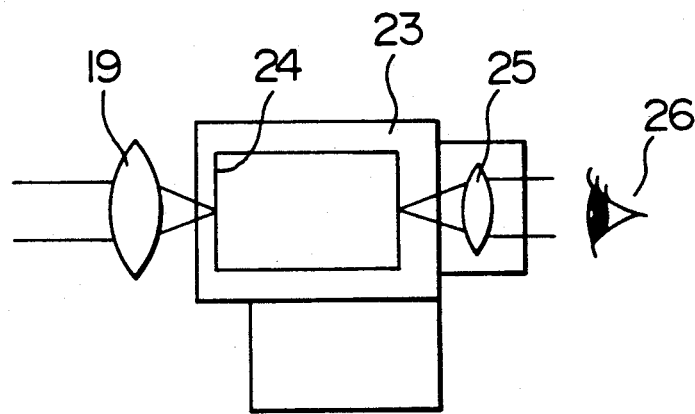
FIG. 3 and FIG. 4 are diagrams showing an observation system of the apparatus based on other embodiments of the present invention.

FIG. 3 shows another embodiment of the present invention pertinent to the observation system of the laser machining apparatus. The image of the work piece provided by the focusing lens 19 is received by the light sensitive screen 24 of a ultraviolet image intensifier 23 so that the resulting visible light image can be observed directly by the eye 26 of the operator through an eyepiece lens 25. In this case, the controller and display unit can be eliminated. Owing to a large electrical amplification, even a faint observation image can fairly be seen.

Figure 4:
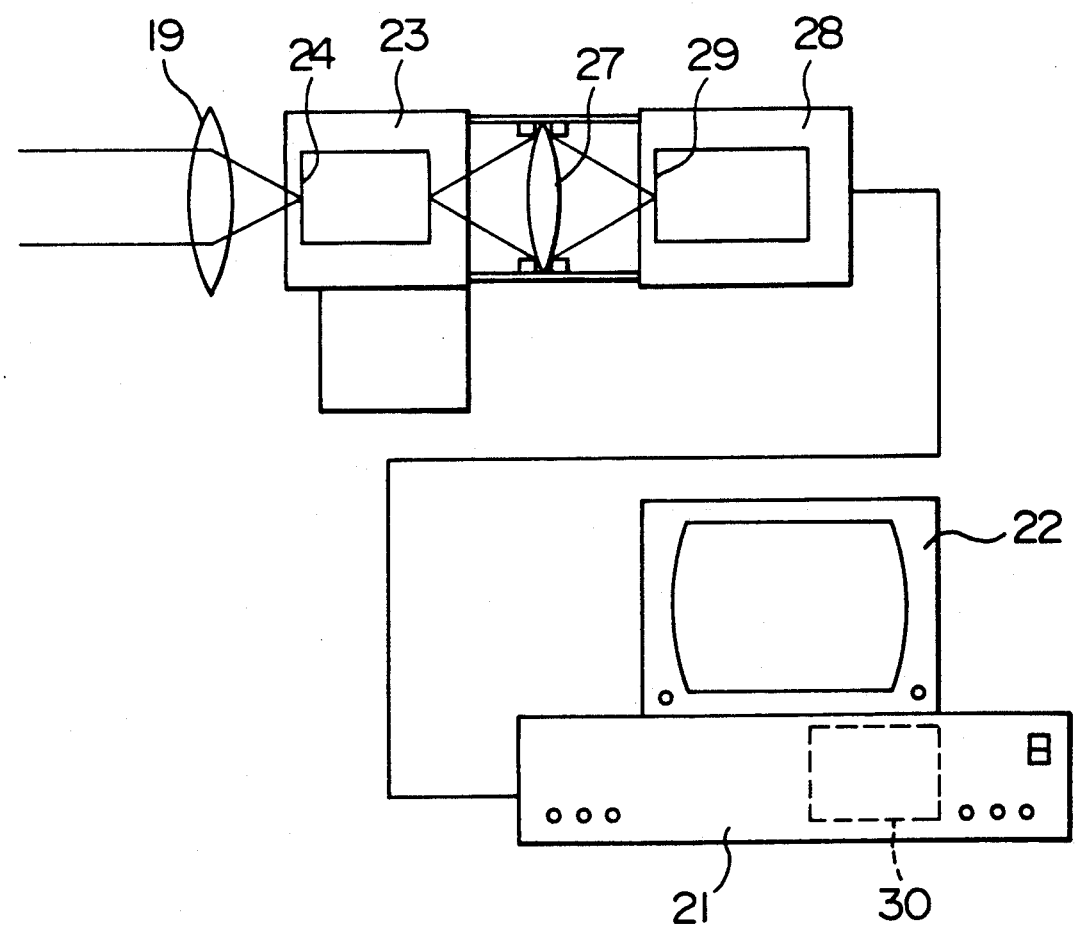

FIG. 4 shows another embodiment of the observation system. The image of the work piece provided by the focusing lens is received by the light sensitive screen 24 of a ultraviolet image intensifier 23 having a 60 dB amplification, and the resultant visible light image is focused by a relay lens 27 on the light sensitive screen 29 of an image pickup tube 28, which converts the image into an electrical signal. The image signal is processed by an image signal processor 21, which displays a resultant observation image on a display unit 22. This system is capable of eliminating the background noise, and a faint image of work piece can be seen at high resolution. By providing an image emphasizing module 30 in the image signal processor 21, the quality of image can further be improved.

Figure 5A:
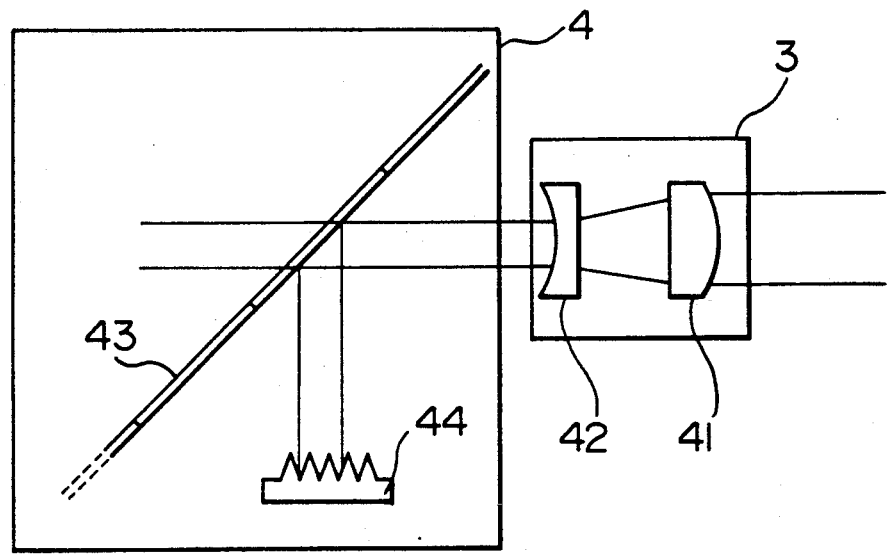
FIGS. 5A-5C are diagrams showing individual beam processing modules according to embodiments of the present invention.
Figure 5B:
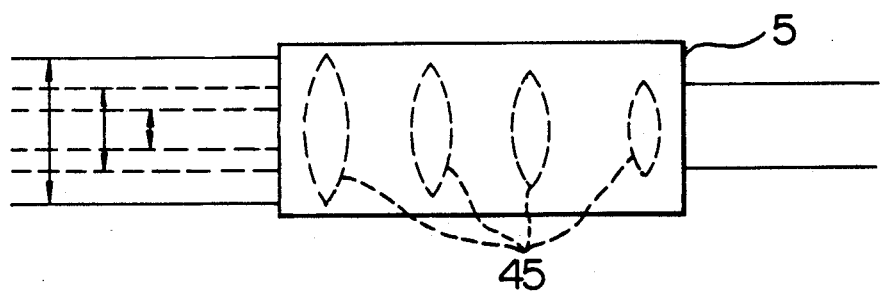
Figure 5C:
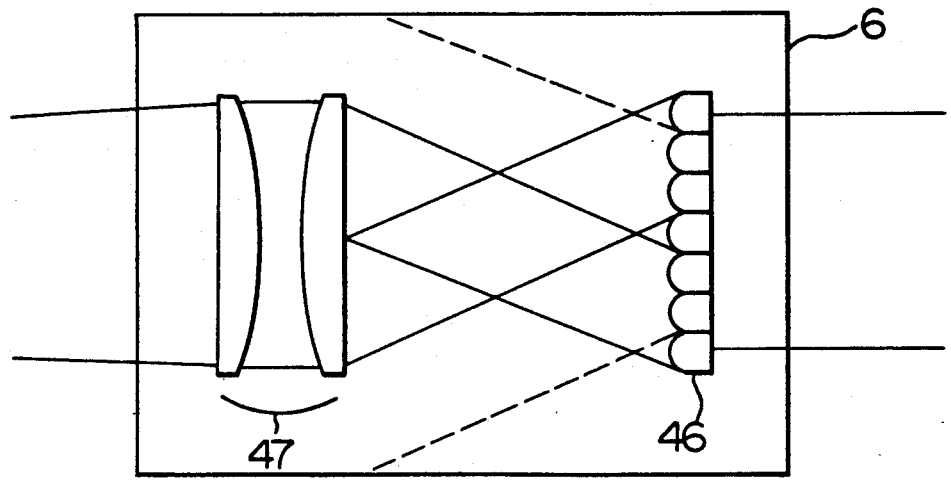

FIGS. 5A-5C show embodiments of individual sections of the inventive apparatus. FIG. 5A shows the beam shaper 3 and transmittance filter 4. The beam shaper 3 is made up of a convex bar lens and a concave bar lens. It receives a laser beam with a 30-by-10 mm rectangular cross section to produce a laser beam with a 10-by-10 mm square cross section, so that the rear-stage optical system can be simplified. The transmittance filter is an alignment of mirrors 43 of dielectric materials with transmittances of 5%, 10%, 20%, 30%, 50% and 100% tuned to the 193 nm wavelength. The filter can be set to use a section of an intended transmittance thereby to adjust the intensity of laser beam so that a wide range of machining condition can be covered. The reflected unwanted laser beam is directed to a beam damper 44 and absorbed by it.

FIG. 5B shows the zoom optical system 5. The system operates to vary the magnification from ½ to 2 for the incident image by moving a lens suite 45, allowing arbitrary setting of the laser power density from ¼ to 4 fold, and the range of machining condition can further be expanded.

FIG. 5C shows an embodiment of the structure of the beam integrator 6. The arrangement includes an alignment of seven small convex bar lenses 46, which is followed by a pair of large convex bar lenses 47, so that a uniformed laser beam is collimated. The resulting beam intensity distribution is within a range of plus/-minus several percent, and it contributes significantly to uniform machining.

Figure 6:
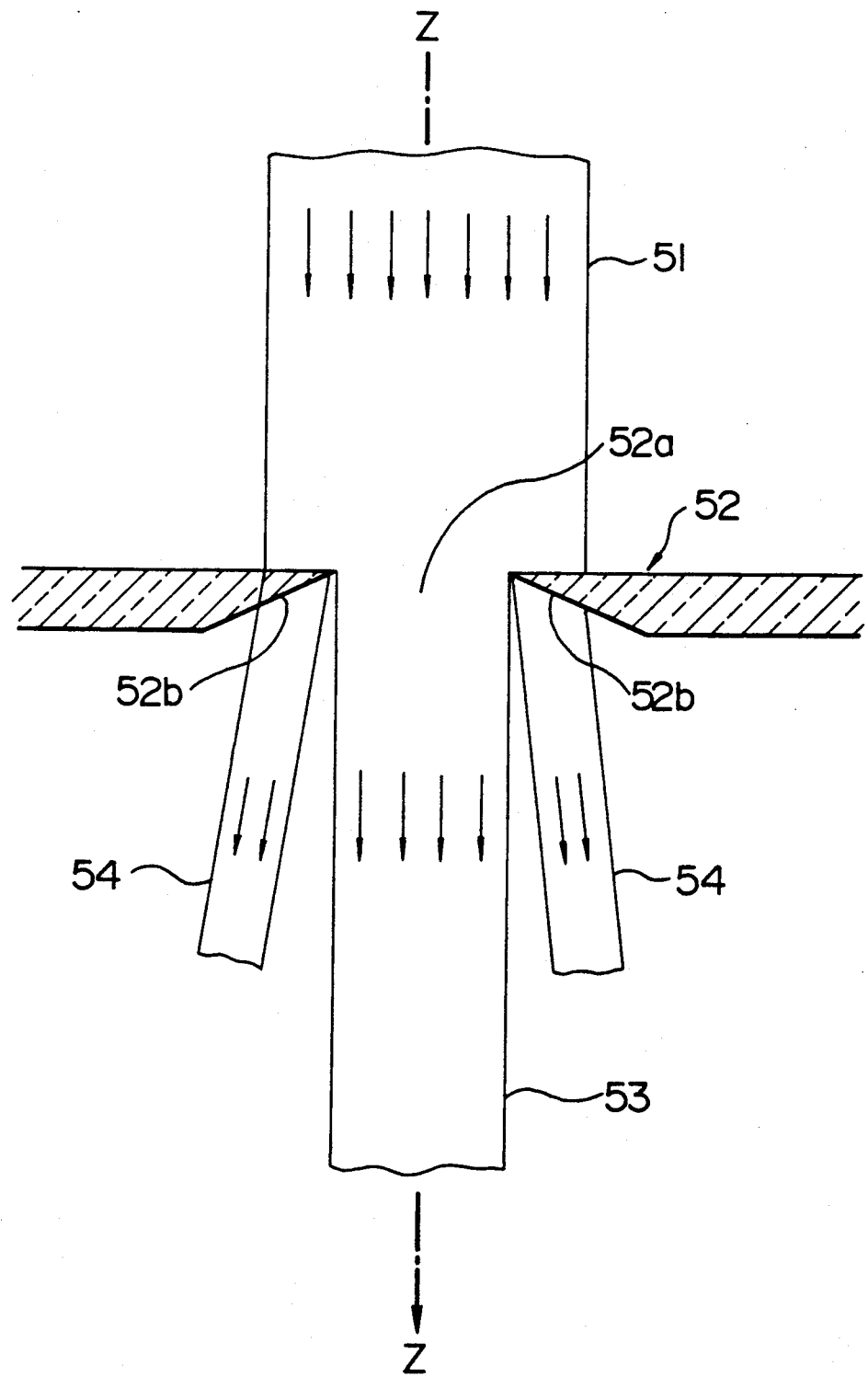
FIG. 6, FIG. 7 and FIG. 8 are diagrams showing the arrangements of the laser beam shaping units used in the inventive apparatus, each figure showing by model the light path on the cross section of the unit.

FIG. 6 shows, as a first example, the arrangement of the laser beam shaper which is used for the function of the aperture slit 8 in the foregoing embodiment. The figure shows by model a cross section of the device, with the light path being illustrated in it. A parallel laser beam 51 is projected downwardly in the Figure along the optical axis Z—Z. A slit member 52 is disposed perpendicularly to the optical axis Z—Z. The slit member 52 has an aperture 52*1* having an intended shape, with its peripheral section 52*b* being formed to function as a prism. The prism section 52*b* has an upper surface (the side exposed to the laser beam 51) which is a plane orthogonal to the optical axis Z—Z, and has a lower surface which is tapered to form a knife edge around the aperture 52*a*. The slit member 52 is made of a material which is transparent for the laser beam. Specifically, a material is chosen depending on the wavelength of the laser beam, and it is preferably an optical glass, fusion quartz or synthesized quartz in dealing with a laser beam ranging between near infrared and ultraviolet rays.

A beam component, out of the laser beam 51, which enters the aperture 52*a* of the slit member 52 is formed into a laser beam 53 having the same cross-sectional shape as the aperture 52*a*. The remaining portion of the laser beam 51, which is incident on the prism section 52*c*, is refracted by the prism and steered away from the optical axis Z—Z as a refracted laser beam 54.

Since the slit member 52 does not block the laser beam, but it merely refracts or transmits the laser beam, it scarcely absorbs energy of the laser beam, and its wear caused by the laser beam is little enough to be neglected practically. This embodiment produces a laser beam 53 having an intended cross-sectional shape, and yet prevents the beam shaping device from wearing.

Figure 7:
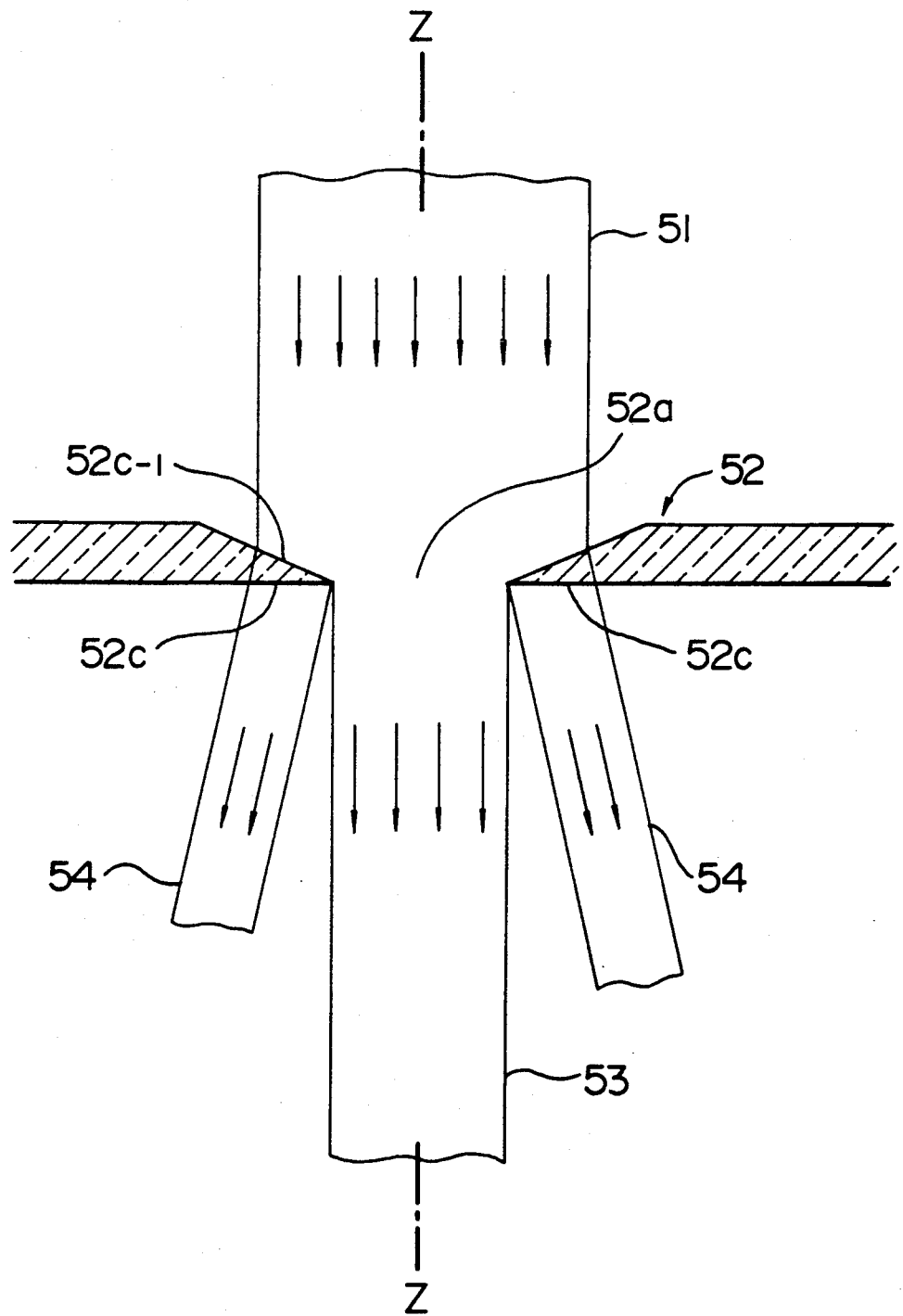

FIG. 7 shows a modification of the embodiment shown in FIG. 6. Like component parts in these Figures are referred to by the common symbols. The modified arrangement differs from the counterpart of FIG. 6 as follows. The slit member 52 has its upper surface (the side exposed to the laser beam 51) tapered to form a prism section 52*c*. This means that the tapered section has a certain angle with the imaginary plane which is orthogonal to the optical axis Z—Z of the laser beam 51. Accordingly, part of the laser beam 51 reflected on the upper surface 52*c*-1 of the prism does not go back to the laser source along the optical axis Z—Z, and it does not adversely affect the operation of the laser sourcing oscillator.

Figure 8:
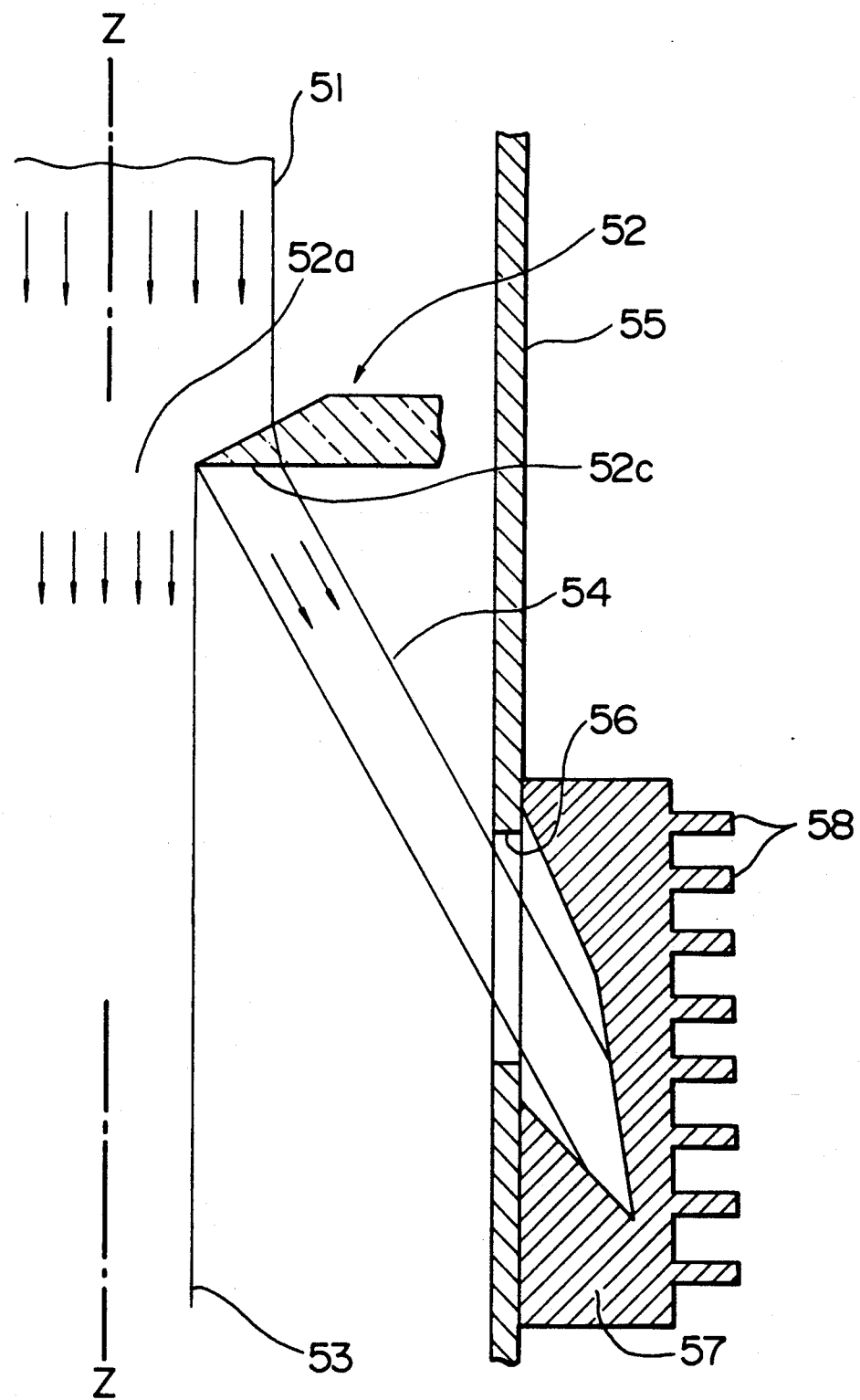

FIG. 8 shows another modification. A slit member 52 is disposed on the light path of the laser beam 51 which is directed downwardly in the Figure along the optical axis Z—Z. The main light path of the laser beam 51 is enclosed by a cylindrical enclosure or casing 55. The Figure shows only the right half portion of the structure which is symmetrical with respect to the optical axis Z—Z.

The casing includes a window 56 at the position where the laser beam 54 refracted by the prism section 52*c* hits, with a laser absorber 57 being attached to the exterior wall to cover the window 56. The laser absorber 57 is provided with heat dissipation fins 58 in this embodiment. The laser beam 54 refracted by the prism section 52*c* enters the laser absorber 57 through the window 56, and energy possessed by the laser beam is transformed into heat.

The slit member in this modification arranged as explained above is transparent for the laser beam and it lets the laser beam transmit through it. Accordingly, the slit member scarcely absorbs energy of the laser beam and it does not wear. The laser beam which enters the aperture of the slit member is shaped to have the same cross section as the aperture, and the rest of the laser beam which is incident on the peripheral prism section is refracted and steered away from the main light path. It becomes possible to shape, as intended, the laser beam with a high power density, and this scheme is advantageous for LSI wiring and mask modification machining which necessitate the projection machining optical system.

The concept of the present invention illustrated in the foregoing embodiments can be applied to a copending U.S. patent application (and European patent application) based on the Japanese Patent Application No. 02-126691 filed on May 18, 1990 assigned to the same assignee as of the present invention, the content of which is herein incorporated by reference.

Figure 9:
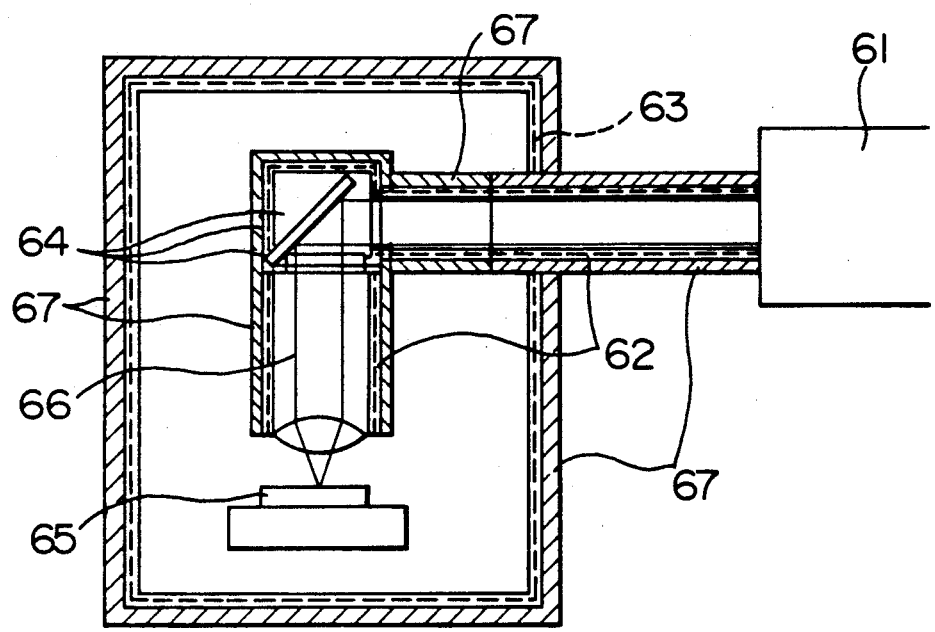
FIG. 9 is a cross-sectional diagram showing the laser application apparatus based on an embodiment of the present invention.

Another embodiment of the present invention will be described with respect to FIG. 9, FIG. 10 and FIG. 11. FIG. 9 is a cross-sectional diagram of the laser machining apparatus which reflects the second feature of this invention. A laser beam 66 produced by a laser source 61, such as of YAG laser or excimer laser, is guided inside a light path cover 62 made of optical glass, quartz glass or the like, referenced in a mirror box 64 made of similar glass, and focused for machining on a work piece 65 which is placed in a machining chamber 63. The machining chamber 63 has its interior wall made of glass. The glass cover 62 and enclosure 63 are provided on their exterior wall with metallic covers 67 which blocks the laser beam.

Part of the laser beam which hits the interior wall of the light path cover 62 or enclosure 63 by some reasons, such as diffraction or scattering, goes through the glass wall, but is blocked by the metallic cover 67, and it does not go out of the apparatus. Even if such a substance as metallic vapor is produced when the metallic cover 67 is hit by the laser beam, it is prevented from entering into the optical path by being blocked by the interior glass wall of the cover 62 and enclosure 63. Accordingly, the performance of the optical parts is not impaired by such emerging substance, and the apparatus can be operated continuously.

Figure 10:
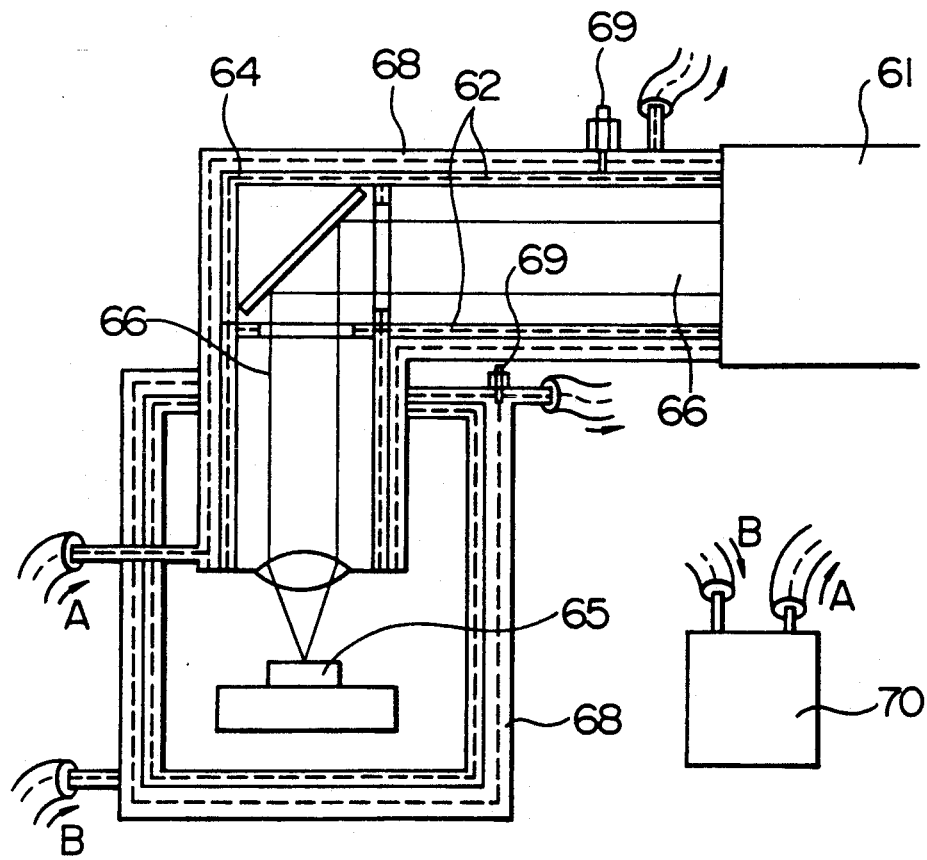
FIG. 10 is a cross-sectional diagram showing the laser application apparatus based on another embodiment of the present invention.

FIG. 10 is a cross-sectional diagram of another embodiment. A ultraviolet laser beam 66 produced by a laser source 61, such as of excimer laser, is guided inside an optical path cover 62 made of glass such as quartz glass which transmits ultraviolet rays, reflected in a mirror box 64 made of similar glass material, and focused for machining on a work piece 65 which is placed in an enclosure 63 made of the same material.

The light path cover 62, enclosure 63 and mirror box 64 are provided on their exterior walls with a light blocking jacket 68 which is filled with liquid, e.g., water, controlled to have a temperature slightly higher than the room temperature and circulated at a constant flow rate. A sensor 69 for detecting the presence or absence of the liquid is provided at the highest portion of the liquid, so that the laser source 61 produces a laser beam only when the presence of liquid is confirmed.

In this arrangement, even if part of the laser beam hits the interior wall of the light path cover 62, enclosure 63 or mirror box 64 by diffraction, scattering or some other reasons, it transmits the glass wall and enters the exterior light blocking jacket 68, by which the ultraviolet rays are absorbed progressively and its energy is carried by the liquid to a thermal exchanger 70 and discharged. The liquid, with its temperature adjusted slightly higher than the room temperature, is circulated back to the light blocking jacket 68, thereby also preventing dew condensation in the interior wall of light path cover 62. Consequently, even if part of the laser beam hits a peripheral member of the light path, it can be taken out harmlessly and the high-power laser application apparatus can be operated stably and continuously.

Figure 11:
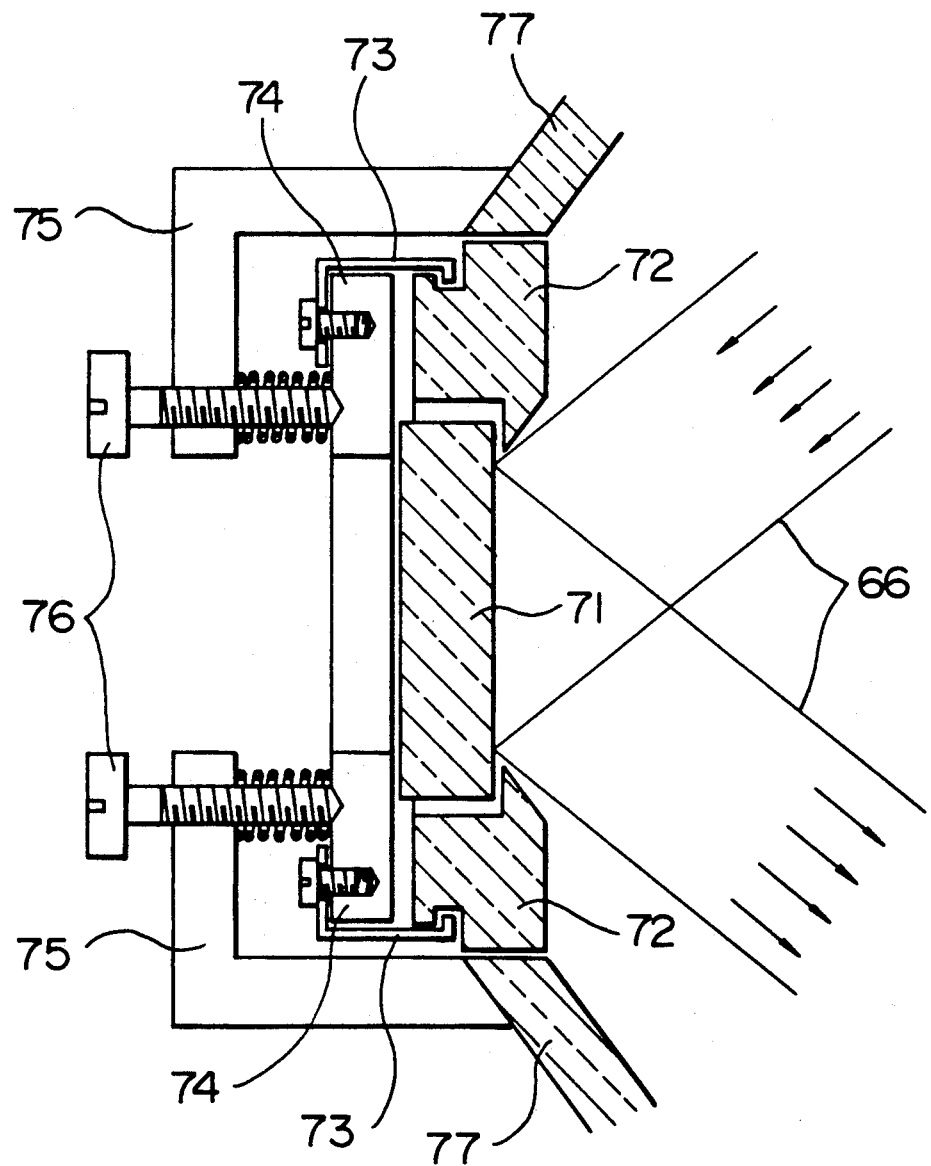
FIG. 11 is a detailed cross-sectional diagram of the laser beam reflector in the mirror box based on an embodiment of the present invention.
Figure 12:
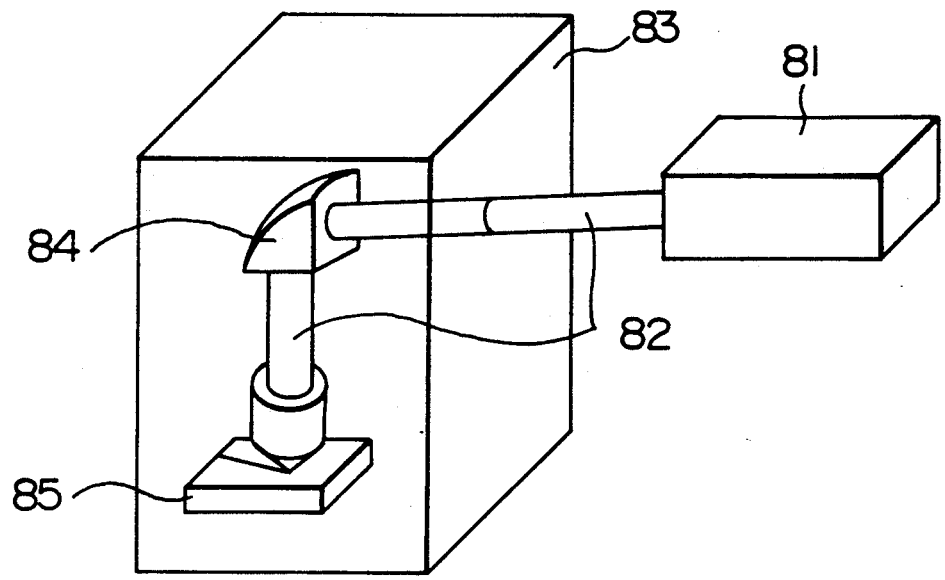
FIG. 12 is a brief perspective diagram showing an example of the prior art.
Figure 13:
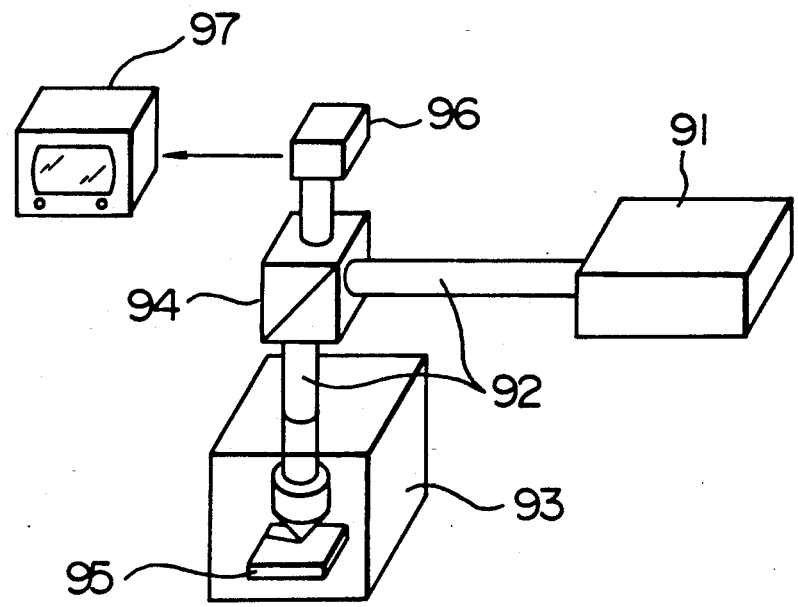
FIG. 13 is a brief perspective diagram showing another example of the prior art.

FIG. 11 shows a cross section of the mirror section in the above embodiment. The mirror box 64 incorporates a mirror holder 75 which is made of glass material for the surface exposed to the laser beam. The laser beam 66 has its light path varied by 90° by being reflected by the mirror 71. The mirror 71 is supported by a frame 72 made of glass, and the frame 72 is fixed on a mirror receptacle 74 by means of latches 73. The mirror receptacle 74 is mounted on the mirror holder 75 through adjusting screws 75. The mirror holder 75 has one side exposed to the laser beam 66 provided with a guide plate 77 made of glass, so that no contaminant is produced by the irradiation of the laser beam. Consequently, even if part of the laser beam hits a peripheral member of the light path, it can be taken out harmlessly and the high-power laser application apparatus can be operated stably and continuously.

We claim:

1. A laser machining apparatus comprising a laser source which produces a laser beam; mirror means for reflecting the laser beam thereby to vary a light path of the laser beam; objective lens means for converging the laser beam reflected by said mirror means and projecting the laser beam on to a work piece; first illumination light means for producing illumination light for illuminating the entireness of said work piece through said objective lens means; a first beam splitter which receives an image of said illuminated work piece through said objective lens means and reflects the image thereby to vary a light path of the image; beam absorbing means for absorbing part of the laser beam reflected by said first beam splitter; and observation means for focusing the image reflected by said first beam splitter thereby to display the image, said laser beam produced by said laser source and said illumination light produced by said illumination light means being set to have wavelengths determined to be substantially equal to each other.

2. A laser machining apparatus according to claim 1 further comprising beam shaping means disposed between said mirror means and said objective lens means, said beam shaping means shaping the laser beam to have a desired shape; second illumination light means for producing second illumination light for illuminating a beam image of said beam shaping means thereby to produce a projection image; and second beam absorbing means for absorbing the laser beam which transmits said mirror means, said mirror means being formed of a second beam splitter.

3. A laser machining apparatus according to claim 2, wherein said beam splitter has proportions of splitting for said laser beam and said observation light ranging from 5%-to-90% to 30%-to-70%.

4. A laser machining apparatus according to claim 1, wherein said laser beam has a wavelength of invisible light range.

5. A laser machining apparatus according to claim 4, wherein said observation means comprises an infrared imaging tube.

6. A laser machining apparatus according to claim 4, wherein said observation means comprises an image intensifier.

7. A laser machining apparatus according to claim 6, wherein said image intensifier has a resultant image thereof imaged with said infrared imaging tube.

8. A laser machining apparatus according to claim 5, wherein said observation means comprises an image processor which implements such signal processings as multiplication and background noise removal for an image signal produced by said infrared imaging tube.

9. A laser machining apparatus according to claim 1, wherein said laser source is tuned to a vacuum ultraviolet range, and wherein as optical enclosure is filled with inert gas.

10. A laser machining apparatus according to claim 1, wherein said wavelength is an wavelength of vacuum ultraviolet rays.

11. A laser machining apparatus according to claim 1, wherein said wavelength is an wavelength of far-infrared rays.

12. A laser machining apparatus according to claim 1, wherein said wavelength is an wavelength of soft X rays.

13. A laser machining apparatus according to claim 2, wherein said beam shaping means comprises a slit member made of laser beam refracting material and disposed on the light path of the laser beam, said slit member blocking an unnecessary portion of the laser beam thereby to shape the laser beam to have a desired cross-sectional shape.

14. A laser machining apparatus according to claim 2, wherein said beam shaping means comprises a slit plate member made of laser beam transmitting material and disposed on the light path of the laser beam, and a prism section which is formed in the periphery of said slit and tapered toward the inside of said slit, said slit plate member and said prism section blocking the peripheral portion of the laser beam thereby to shape the laser beam to have a desired cross-sectional shape.

15. A laser machining method of machining a work piece using a laser machining apparatus comprising the steps of: generating an observation light beam having a wavelength substantially equal to the wavelength of a laser beam which is projected to the work piece; letting an operator to observe the work piece by using the generated observation light; and controlling machining conditions of the work piece based on the result of observation so that the work piece is machining accurately through the projection of the laser beam.

16. A laser machining method of machining a work piece using a laser machining apparatus comprising the steps of: generating an observation light beam having a wavelength close to the wavelength of a laser beam which is projected on the work piece; letting an operator to observe the work piece by using the generated observation light and an objective lens which is tuned to the color of said wavelength; and controlling operating parameters between the work piece and the laser beam depending on the result of observation so that the work piece is machined accurately through the projection of the laser beam through said objective lens.

17. A laser machining method according to claim 16, wherein said wavelength is of vacuum ultraviolet rays.

18. A laser application apparatus comprising a laser projection section enclosure at the final stage of a laser beam guide section which guides a laser beam from a laser oscillator to a work piece, said enclosure having a side nearer to the laser beam made of material that transmits the laser beam.

19. A laser application apparatus according to claim 18, wherein said laser beam transmitting material is glass.

20. A laser application apparatus according to claim 19, wherein said glass comprises synthesized quartz or fusion quartz.

21. A laser application apparatus according to claim 18, wherein said laser beam enclosure has the opposite side farther than the laser beam made of laser beam blocking material.

22. A laser application apparatus according to claim 21, wherein said laser beam blocking material comprises an inorganic material.

23. A laser application apparatus according to claim 22, wherein said inorganic material comprises a metal.

24. A laser application apparatus according to claim 22, wherein said inorganic material comprises water.

25. A laser application apparatus according to claim 18, wherein both said projection section enclosure and said laser beam guide section have a side nearer to the laser beam made of a material that transmits the laser beam.

26. A laser application apparatus according to claim 25, wherein each of said laser beam guiding section and said enclosure includes a laser beam blocking material covering an outer side thereof.

* * * * *